March 4, 1958 H. E. SLOAN ET AL 2,825,572
COMPENSATING SCROLL CHUCK
Filed March 21, 1956

INVENTORS.
Harry E. Sloan
and Alban Collette
BY
Attorney.

![United States Patent Office]

2,825,572
Patented Mar. 4, 1958

2,825,572

COMPENSATING SCROLL CHUCK

Harry E. Sloan, Hartford, and Alban Collette, Newington, Conn., assignors to The Cushman Chuck Company, Hartford, Conn., a corporation of Connecticut Application March 21, 1956, Serial No. 572,911

3 Claims. (Cl. 279—116)

This invention relates to chucks in general, and to a self-compensating universal chuck in particular.

The type of universal chuck to which the present invention relates is customarily hand-operated insofar as the jaw-operating mechanism is concerned, and the latter includes a well-known rotary scroll disc the scroll thread of which meshes with teeth on the jaw carriers for simultaneously moving the jaws thereon into and from gripping engagement with work on operating the disc in opposite directions. For its operation in opposite directions, the scroll disc is customarily provided with bevel teeth which mesh with manually operable gear means in the chuck body. In order to maintain the scroll disc in proper mesh with both, the jaw carriers and also the manual gear means, the scroll disc is customarily journalled in the chuck body for independent rotation about the center axis of the latter. Accordingly, the jaws of a scroll chuck, besides functioning to clamp work, assume the further function of also centering the work.

Universal chucks of the aforementioned scroll type are advantageous in many respects. Thus, chucks of this type are relatively low in cost, lend themselves to rapid chucking of work, and may quickly be operated by hand. Also, they are adaptable to many different kinds of work of widely different dimensions. Nevertheless, chucks of this type are limited in their use to work which is permitted to be centered thereon by the gripping jaws thereof and, hence, do not lend themselves to a large class of special work requiring centering independently from the gripping jaws, such as work of which the real center of the surface portions being gripped by the jaws is inherently off, or may be off, with respect to a desired center with reference to which the work is to be operated on, for instance. To accommodate this special work, therefore, recourse is had to compensating-type chucks, other than scroll chucks, on which the work is centered by means other than the gripping jaws, and the latter have some freedom to float so as to grip the work with equal force despite possible or inherent off-center condition of the work surface being gripped. While these compensating-type chucks are entirely satisfactory for this special work, they lack certain of the important advantages of scroll-type chucks. Thus, the known compensating-type chucks are of more complicated construction, and hence higher in cost, than scroll-type chucks, and customarily require additional power equipment for their jaw operation.

It is the primary aim and object of the present invention to provide a scroll-type chuck featuring jaw self-compensation, thereby to make available for work of the aforementioned special kind a chuck of this type with all its aforementioned important advantages.

Thus, it is among the objects of the present invention to provide a chuck of this type of which the scroll disc is bodily floatable in any direction in a plane at right angles to the chuck axis, and is in any position in this plane, and even while floating therein, operable in opposite directions to move the jaws into and from gripping engagement with work which is centered on the chuck by means other than the jaws, thereby causing all jaws to come first into uniform engagement with the work despite unevenness or off-center condition of the work surface being engaged thereby, and then to grip the work all at once with the same force, on merely operating the scroll disc in the proper direction for jaw-closure on the work.

It is another object of the present invention to provide a self-compensating scroll chuck of this type which for its self-compensating jaw action relies on floatability of the scroll disc as aforementioned, and in which the scroll disc is the only floatable part, its manually operable gear means being mounted in conventional non-floating fashion, thereby to obtain a compensating scroll chuck with the least departure from the approved construction, and with no departure whatever from the approved manipulation of the jaw-operation mechanism, of the aforementioned conventional non-compensating scroll chuck and approximately at the same, or only slightly higher, cost as the latter.

Another object of the present invention is to provide a self-compensating scroll chuck of this type in which the aforementioned conventional non-floating mounting of the manually operable gear means for the scroll disc is achieved, despite the floatability of the latter, by dividing the scroll disc with its customary scroll thread and bevel teeth on opposite faces thereof into two separate parts or discs of which one is a non-floatingly journalled bevel gear and the other a floatingly mounted scroll, and by providing a simple flexible coupling between these parts, such as a radially floatable pin-type driving connection, for instance.

Other objects and advantages will appear to those skilled in the art from the following, considered in conjunction with the accompanying drawings.

In the accompanying drawings, in which certain modes of carrying out the present invention are shown for illustrative purposes:

Figure 1:
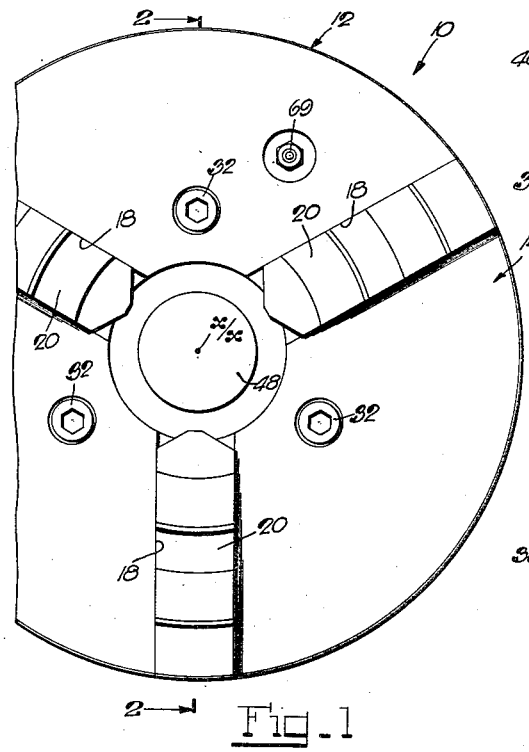
Fig. 1 is a front view of a compensating scroll chuck embodying the present invention.
Figure 2:
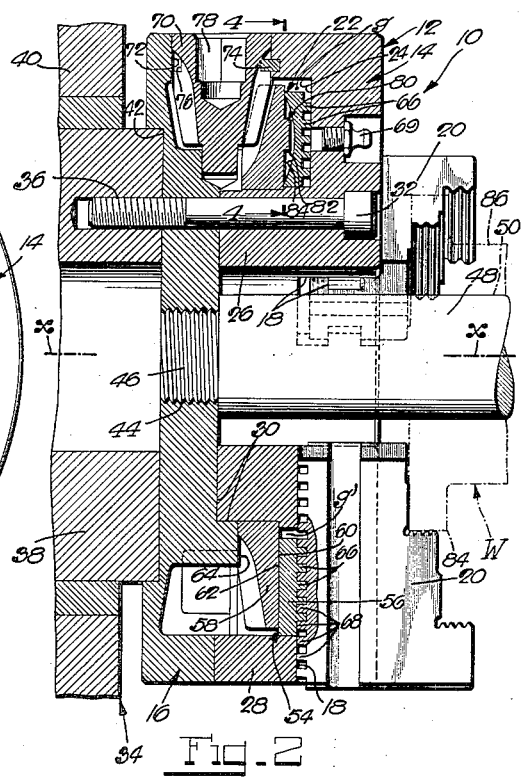
Fig. 2 is a longitudinal section through the chuck as taken substantially on the line 2—2 of Fig. 1, and with its operating parts shown in relation to certain exemplary gripped work.

Referring to the drawing, and more particularly to Figs. 1 and 2 thereof, the reference numeral 10 designates a compensating universal chuck having a body 12 with a longitudinal axis x—x which for most applications of the chuck constitutes the rotary axis of the latter. The chuck body 12 is, in the present instance, formed of complementary front and rear sections 14 and 16, respectively, of which the front section 14 has guideways 18 in which jaws 20 are movable into and from gripping engagement with work W, and both body sections 14, 16 have jaw-operating mechanism 22 nested therebetween. In the present example, the front body section 14 is provided with three equiangularly-spaced radial guideways 18 for the jaws 20.

The front body section 14 has in its rear an annular recess 24 leaving the same with a central hub 26 and a peripheral skirt 28 of which the hub is fittedly received in an annular recess 30 in the rear body section 16 for accurate location of the front section 14 thereon. The companion body sections 14 and 16 are, in the present instance, held in releasably assembled relation with each other by a plurality of bolts 32 which serve also for the releasable attachment of the chuck to a lathe or other machine tool 34. The bolts 32 are to this end threadedly received at 36 by the power spindle 38 in the head 40 of the machine tool, and the chuck may accurately be located on the power spindle 38 by the fitted reception of the latter in an annular recess 42 in the rear section 16 of the chuck body. If desired, an additional bolt or bolts (not shown) may extend from the front body section 14 into, and be threadedly received by, the rear body section 16 in order to hold them in their assembled relation when the chuck is removed from the machine tool.

The instant chuck, being of a compensating type, includes at least a suitable mounting for equipment with which to center work on the chuck by means other than the work-gripping jaws 20, the work-centering equipment to be provided either by the chuck manufacturer as part of the chuck, as usual, or by the user of the chuck in some cases. In the present example, the mounting in the chuck for suitable work-centering equipment is in the form of a central threaded hole 44 in the rear body section 16 for the reception of a threaded shank 46 of a suitable work center. In the present example also, the work center, designated by the reference numeral 48, is in the form of a locating pin or stub on which the exemplary work W is received with its machined center bore 50 the axis of which thus coincides with the chuck axis $x$—$x$ and may constitute the reference axis for a further external machining operation or operations, for instance, on the work while the same is gripped by the jaws 20 in preference to the grip of a collet, for instance, in the center bore 50 thereof. Of course, the instant chuck may, in lieu of the exemplary work locating pin 48 and for other work to be gripped, be provided with a conventional tapered center (not shown) on which to locate the adjacent end of the work, in which case the opposite center for the other end of the work may be carried by the tailstock of the lathe on which the chuck is mounted.

Figure 3:
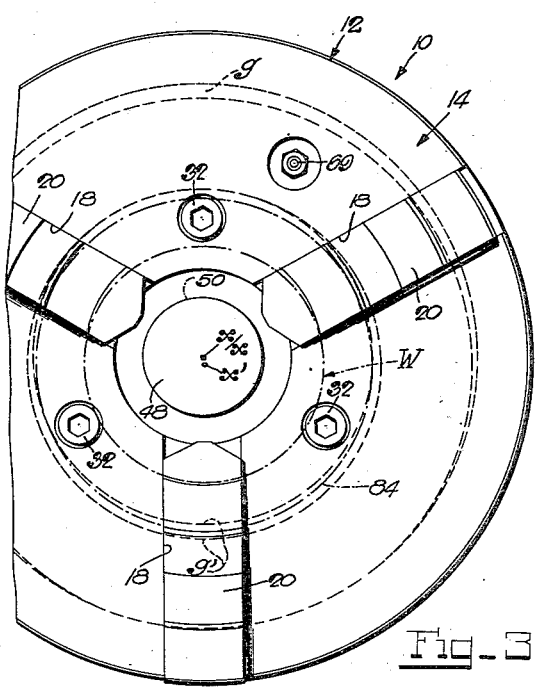
Fig. 3 is another front view of the chuck, but showing certain operating parts thereof in relation to the exemplary gripped work.

The jaw-operating mechanism comprises, in the present instance, a scroll-type jaw actuator 54 and operating gear therefor. In accordance with the present invention, the scroll-type jaw actuator 54, contrary to being a conventional one-piece scroll disc with its customary scroll thread and also bevel gear teeth, is provided in two separate parts 56 and 58, of which the part 56 is a scroll member and the part 58 is its gear member, in this instance a bevel gear member. The scroll and bevel gear members 56 and 58 are located in the annular recess 24 in the front body section 14, and are held against axial movement therein and in engagement with each other at their respective faces 60 and 62 by an annular shoulder 64 on the rear body section 16. The bevel gear member 58, hereinafter simply referred to as "bevel gear" and forming part of the operating gear for the scroll member 56 hereinafter simply referred to as "scroll," is journalled on the hub 26 of the front body section 14 for rotation about the chuck axis $x$—$x$, while the scroll 56 is bodily floatable, in any direction in a plane at right angles to the chuck axis $x$—$x$, within limits defined by the maximum outer and inner gaps $g$ and $g'$ between the scroll 56 and the skirt 28 and hub 26, respectively, of the front body section 14 (Figs. 2 and 3). The scroll 56 is at its front provided with a conventional spiral or scroll thread or tooth 66 which is in mesh with corresponding tooth formations 68 in back of the guided jaws 20. The meshing thread 66 of the scroll 56 and tooth formations 68 of the jaws 20 are preferably kept lubricated by grease admitted thereto through a nipple 69 in the front body section 14.

The operating device for the scroll 56 further includes, in the present instance, a bevel pinion 70 which is journalled in a bore 72 formed partly in each of the body sections 14 and 16, and is held against axial movement by a key 74 which is locked in the front body section 14 and projects into a peripheral groove 76 in the bevel pinion so that the latter may be turned in opposite directions, having to this end a socket 78 for the reception of a suitable wrench.

Figure 4:
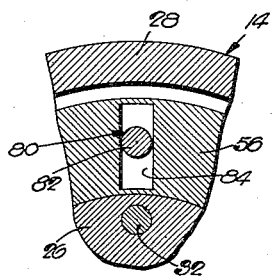
Fig. 4 is a fragmentary section taken substantially on the line 4—4 of Fig. 2.
Figure 5:
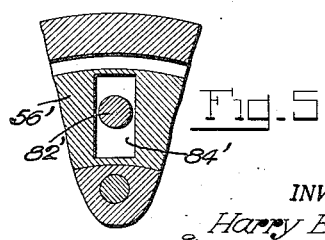
Fig. 5 is a fragmentary section similar to Fig. 4, showing an alternative arrangement of certain parts of the chuck.

Further in accordance with the present invention, there is provided between the bevel gear 58 and the scroll 56 a flexible coupling 80 which permits the latter to float, as aforementioned, despite its driving connection with the journalled bevel gear 58. In the present example, this flexible coupling 80 is of the single slider type, the bevel gear 58 and scroll 56 being to this end provided with an eccentric projecting pin or lug formation 82 and a radial groove 84, respectively, of which the former projects into the latter (Figs. 2 and 4). While the lug formation 82 on the bevel gear 58 is shown in Fig. 4 to have substantially a sliding fit in the radial groove 84 in the scroll 56, Fig. 5 shows an alternative coordination of the lug formation 82' on the bevel gear with the radial groove 84' in the scroll 56', in that the lug formation 82' is of a diameter which is smaller than the width of the groove 84' and, hence, has some lateral freedom in, or clearance from, said groove.

Let it now be assumed that the exemplary work W, centered on the locating pin 48 in the exemplary angular position shown in Figs. 2 and 3, is to be gripped by the jaws 20 at its end flange 84 and that the latter is for any reason eccentric with respect to the axis of the center bore 50 therein to the extent shown in Fig. 3 in which $x'$ designates the true center axis of the end flange 84. Under these circumstances, it stands to reason that on operating the bevel pinion 70 in the proper direction to cause closure of the jaws 20 on the work W the scroll 56 will be compelled to float or yield, into the exemplary eccentric position shown in Figs. 2 and 3, after the first one or two jaws engage the end flange 84 of the work and while the remaining jaw or jaws close in on the same, for uniform engagement of all jaws with the exemplary eccentric end flange 84 on the centered work W is possible only on assumption by the scroll 56 of a coincident eccentric position. Hence, it is only after all the jaws 20 are in uniform engagement with the eccentric work flange 84 and the scroll 56 has floated into axial alignment with the true center $x'$ of the same (Fig. 3) that the jaws will, on continued forced operation of the bevel pinion 70 in the same direction, simultaneously exert the same gripping force on the work flange 84. The work may now be machined, as by turning part of the similarly eccentric body 86 thereof, for instance, cylindrical with respect to the axis of the center bore 50 thereof which in this case coincides with the chuck axis $x$—$x$.

It will now be appreciated that, by virtue of the separate arrangements of the scroll 56 and of its operating mechanism and the provision of a flexible coupling between them, and by the further provision of at least a mounting for work-centering means, the instant scroll-type chuck is truly compensating in its action on all kinds of work. Thus, the instant compensating scroll chuck lends itself to any kind of work of which the surface or surfaces to be gripped by the jaws are off with respect to a reference axis on which the work is to be centered by means other than the gripping jaws, and which in most cases will be coincident with the center axis of the chuck. In this connection also, it is fully within the purview of the present invention to arrange the chuck for centering work externally and arrange the jaws for their internal grip on the work.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency

What is claimed is:

1. A compensating universal chuck, comprising a chuck body having a longitudinal axis and a mounting for work-centering means; jaws on said body and guided thereby for movement into and from gripping engagement with work; a scroll member bodily floatable in said body in a plane at right angles to said axis and operatively connected with said jaws to move them into and from uniform gripping engagement with centered work on turning said scroll member in opposite directions, respectively; an operating means for turning said scroll member including another member journalled in said body for rotation about said axis and a flexible coupling between said members to permit said scroll member to float relative to said other member.

2. A compensating universal chuck as set forth in claim 1, in which said coupling is formed by an eccentric pin on one of said members and a substantially radial groove in the remaining member into which said pin projects.

3. A compensating universal chuck as set forth in claim 1, in which said other member is a bevel gear, and said operating means further includes a manually operable bevel pinion journalled in said body and meshing with said bevel gear.

References Cited in the file of this patent

UNITED STATES PATENTS

| | | |
|---|---|---|
| 823,033 | Church | June 12, 1906 |
| 2,101,926 | Wettig | Dec. 14, 1937 |